United States Patent [19]

Lewis

[11] Patent Number: 4,685,102
[45] Date of Patent: Aug. 4, 1987

[54] SWITCHING SYSTEM LOOPBACK TEST CIRCUIT

[75] Inventor: Conrad Lewis, Nepean, Canada

[73] Assignee: Mitel Corporation, Ontario, Canada

[21] Appl. No.: 609,443

[22] Filed: May 11, 1984

[30] Foreign Application Priority Data

Jun. 16, 1983 [CA] Canada ................................. 430531

[51] Int. Cl.⁴ ............................................. H04J 3/16
[52] U.S. Cl. ................................................... 370/15
[58] Field of Search ................................. 370/13, 15; 179/175.2 R, 175.3 F

[56] References Cited

U.S. PATENT DOCUMENTS

| | | | |
|---|---|---|---|
| 4,046,964 | 9/1977 | Daugherty | 370/15 |
| 4,279,032 | 7/1981 | Smith | 370/15 |
| 4,435,704 | 3/1984 | Hashimoto et al. | 370/15 |
| 4,486,877 | 12/1984 | Turner | 370/15 |

Primary Examiner—Douglas W. Olms
Assistant Examiner—Kenneth I. Rokoff
Attorney, Agent, or Firm—Antonelli, Terry & Wands

[57] ABSTRACT

This invention relates to a switching system testing arrangement which uses a looparound circuit, into which a test signal is injected and received to determine whether the loop is functioning properly. The system provides means for testing individual switches (or equivalent time division counterpart), individual loops and links between switching stages and the network, complete loops between peripherals, short loops between peripherals and their local control units, or any loop that can be set up within the system, without incurring loss of use of parts of the system which would otherwise be required to obtain the loop but are not of interest to test. The control data and test signals are applied, to set up the loop and into the loop respectively, via message transmission paths which are separate from the loop under test. Accordingly any part of the communication circuit system can be isolated for test, reducing substantially the time overhead for determining whether a switching element or stage, or link is operating properly.

18 Claims, 10 Drawing Figures

SWITCHING SYSTEM LOOPBACK TEST CIRCUIT

This invention relates to a switching system and particularly to a looparound arrangement in a switching system whereby transmission paths of the system can be tested.

Switching systems are commonly used to interconnect signal transmission paths between peripheral units such as telephone sets, a telephone set and a trunk, tone receiver, tone generator, etc. A typical system is formed of a switching network which may have several stages, peripheral interface circuits such as line circuits, trunk circuits, etc. which are connected to the switching network, and a common control. When a peripheral unit generates a signal which indicates a request for service, the common control sets up a connection through the switching network between the required peripheral units. The same general functions are provided whether the system operates as a space division switching network or as a time division switching network.

Transmission paths through various switched links (either space or time divided switched paths) must of necessity be set up through either active or passive components. Because these components sometimes fail, it is an important function of the system to test the transmission paths and switches in order to ensure that they are not faulty. One of the techniques used for testing the transmission paths and switches is to set up a transmission path loop through the switching network and to connect a matrix testing apparatus to the loop to inject a signal into the path and to receive the resulting signal which has passed through the loop, and to compare it with the signal which was transmitted. Any difference between the signals represents imperfect characteristics of the transmission paths which form the loop.

The above-noted system for testing transmission paths requires loops to be set up between peripheral units through the main switching network in order to properly test each available transmission path. Consequently it utilizes significant numbers of switching network crosspoints (both space division forms of crosspoints or equivalent time division equipment) for significant periods of time, which crosspoints (or time division equivalents) and their associated links are unavailable for use during the testing interval. It has been found that this type of looparound testing significantly reduces the traffic carrying capacity of the system.

The above-described looparound testing system has also been utilized between junctors and peripherals, rather than between peripherals via the junctors. In this case a tone is injected from the junctor to the peripheral and the resulting tone is received back by a testing unit. This type of looparound testing has also been found to significantly reduce the traffic carrying capacity of the network.

In another technique of testing switching networks, in particular in PCM (pulse code modulated) signal switching systems, two extra binary test bits are injected into all messages. Similar test messages are transmitted via a loop to the two communicating peripherals. If the messages received by the peripherals are the same, then the loop is assumed to have tested satisfactorily.

However, in this technique since there is constant checking of transmission loops during all communications, there is a heavy time overhead, which again significantly reduces the traffic carrying capacity of the system.

The present invention is a method and apparatus for testing the switching network without the requirement to busy out complete transmission loops between peripherals within the system for relatively long periods of time. The present invention provides means for testing individual switches (or equivalent time division counterparts), loops between switching stages and the network, complete loops between peripherals, short loops between peripherals and their local control units, indeed any switch or loop either short or long which can be set up within the system. Thus, the system is versatile and efficient. Further, due to the use of an unique form of switching system, in which control messages are switched and routed separately from communication messages, communication message paths are not required to carry supervisory signals for the testing procedure. Testing is also preferred to be performed during times when the switches or links are idle. The result is a switching system testing facility which has a substantially reduced impact on traffic carrying capacity of the system than in the noted prior art and as well improves the ability of the system to isolate specific faulty components in the system automatically and with a higher degree of precision than before.

This facility is based not only on the unique system structure mentioned above, but also on the separate invention of a combination time and space division switch network which allows communication not only between a plurality of time divided input and output ports, but also with a microprocessor which can communicate between a parallel bus and the serial PCM time divided channels input and output to the switch. This switch is described in Canadian patent application No. 385,726 filed Sept. 11th, 1981, invented by Conrad Lewis, and assigned to Mitel Corporation, and is referred to herein as a DX switch.

A better understanding of this invention will be obtained by reference to the detailed description below, taken in conjunction with the following drawings in which.

Figure 1:
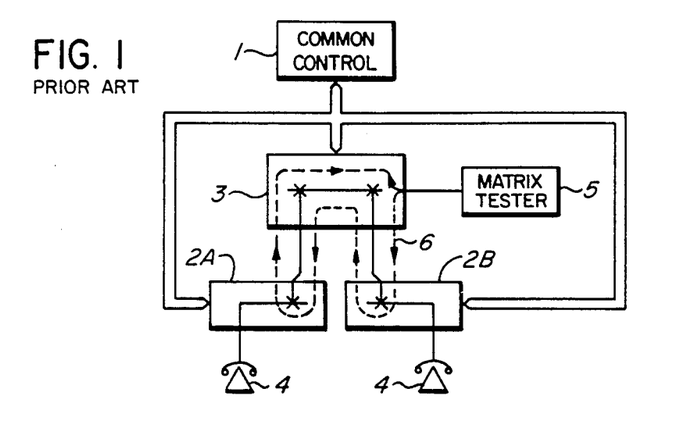
FIG. 1 is a block diagram of a typical prior art system showing a looparound testing facility.

Turning to FIG. 1, a block diagram of a representative prior art type of system is shown. The system is comprised of a common control 1 which controls a switching matrix including one or more first stages 2A, 2B, etc. which are connected via comunication links to a second stage 3. Peripherals such as telephone sets 4 are connected to the first stage or stages. In some forms of prior art network junctors (not shown) are used to interconnect various links in the second stage 3. Trunk circuits are connected in some cases as peripherals or in some cases via a further switching matrix to the second stage 3. There are of course a wide variety of kinds of such systems.

In the prior art form of testing, a matrix tester 5 is connected to the switching network, e.g. via a junctor. The common control 1 sets up a signal path loop 6 (designated by a dashed line). The loop connects the matrix tester 5 through switches of the second stage 3, links connected to the first stage 2B, switches of first stage 2B, further links to the second stage 3, switches through the second stage 3, links connected to first stage 2A, switches within the first stage, links to the second stage 3, further switches within second stage 3 and back to matrix tester 5. Matrix tester 5 then applies a tone to the loop 6 which passes through all of the links and switch crosspoints noted above, and the tone passed through the loop is received back by the matrix tester 5. If the received tone is reduced in amplitude below a predesignated level, does not appear at all, suffers bandwidth or other degradation, carries D.C. current bias which is out of a predetermined range, the matrix tester thus can establish that the transmission path which has been tested is faulty.

The common control 1, after receiving information from the matrix tester 5 (through means which are not shown) that the transmission path is faulty, then must set up numerous alternative complete loop testing paths similar to the above each of which includes a particular link or crosspoint, in order to be able to narrow down and thereby determine which link or switch crosspoint is at fault. Clearly a great deal of testing time and utilization of links and switches are required to test a loop and to isolate a fault.

According to the present invention, individual switches can be tested, as well as loops which are as long or as short as desirable. The system will be described with reference to a PCM time division multiplex switching network, although it is believed that once the principles are understood, a person skilled in the art could design a space division network utilizing similar concepts.

Figure 2:
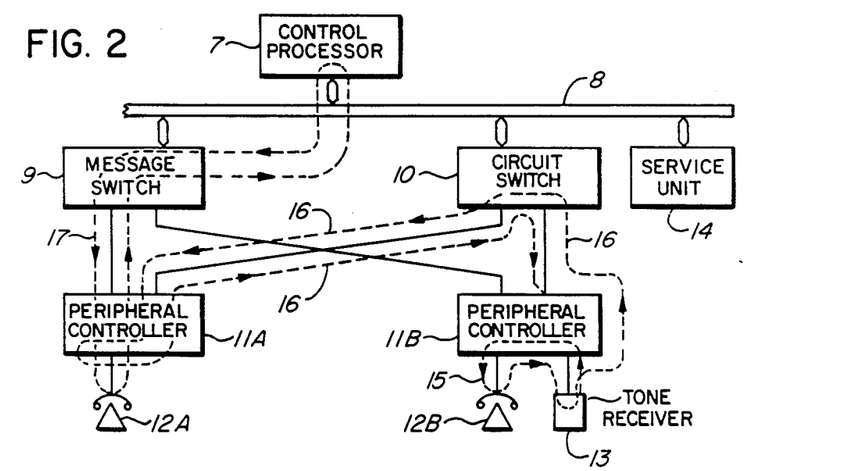
FIG. 2 is a block diagram illustrating a system using the present invention.

Turning to FIG. 2, which illustrates a block diagram of a system implementing the present invention, a control processor 7 communicates via a high speed parallel bus 8 with two kinds of switching networks: a switching network 9 referred to below as a message switch and a switching network 10 referred to below as a circuit switch. Both message and circuit switches are connected via serial links to one or more peripheral controllers 11A and 11B, the peripheral controllers being connected to peripherals 12A, 12B, 13 etc. via peripheral interface units (not shown). Each peripheral controller includes a switching network. For the sake of ease of description it will be assumed that the peripherals include their interface units.

A service unit 14 also is connected to bus 8.

The above-described system is described in Canadian application No. 421,936 filed Feb. 18, 1983, invented by Conrad Lewis and assigned to Mitel Corporation. In that system supervisory and control signals are transmitted between the peripheral controller (or from the peripheral via the peripheral controller) and the control processor via links passing through the message switch 9 and bus 8. Actual communication signals between peripherals pass through circuits set up via links connected from a peripheral, a peripheral controller, circuit switch 10, a peripheral controller to another peripheral. In some cases the circuits are connected between peripherals only through one peripheral controller, and do not pass through the circuit switch 10, for example in the case where a tone receiver 13 is connected to the same peripheral controller as a telephone set 12B, and must receive tone dialing signals from the telephone set. However if the telephone set peripheral 12A is connected to another peripheral controller to which the receiver 13 is not connected, a circuit transmission path is set up between telephone set 12A and tone receiver 13 through peripheral controllers 11A and 11B through circuit switch 10. The supervisory and control signals facilitating the request for service and the setting up of the connection are passed between the tone peripheral or the tone receiver peripheral and the control processor 7 via the separate message links passing through the peripheral controller or controllers, message switch 9 and bus 8.

According to the present invention local supervisory loops of virtually any length can be set up to test virtually any switch or link in the system. For example, to test a short transmission path between a telephone set 12B interface and the tone receiver 13 through peripheral controller 11B, the control processor 7 sends control messages via bus 8 and message switch 9 to peripheral controller 11B to set up a communication loop between the telephone set interface and tone receiver 13 through the switching matrix (e.g. time division switching matrix) in peripheral controller 11B, but excluding links to the circuit switch 10, in this case. In addition, a test message is sent from service unit 14 via bus 8, message switch 9 and peripheral controller 11B into the loop, and the resulting signal having passed through the loop passes back through the message switch link system just described for receipt by the service unit 14. In this manner a small, isolated transmission loop is established and tested.

In a similar manner other forms of loops can be set up and tested. For example the control processor 7 can send messages through bus 8 via the message switch 9 to the peripheral controller 11A, and to circuit switch 10 to set up a circuit switch loop 16 from a peripheral telephone 12A interface, through peripheral controller 11A, circuit switch 10, peripheral controller 11B to the tone receiver 13 interface. A test tone signal is injected into the loop by service unit 14 and the return signal received via the message links as described earlier with reference to local loop 15. In this manner a complete or long loop between peripheral interfaces can be set up and tested.

While testing of circuit paths has been noted, it should also be noted that message switch paths can also be tested. A loop set up to test message switch paths is shown as reference 17. In this example a message switch loop from control processor 7 is set up through bus 8, message switch 9, peripheral controller 11A to an interface of peripheral telephone 12A. A control message is injected by service unit 14 and is received via the return portion of the loop (duplex link) for analysis.

Figure 3:
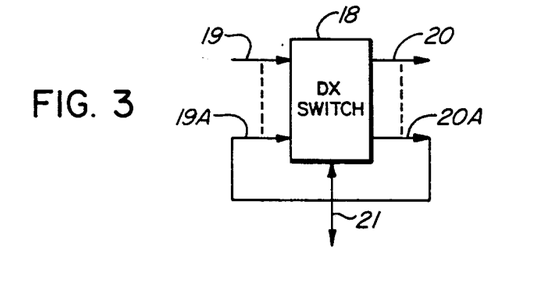
FIG. 3 is a block diagram of the combination time and space division switch network connected in a basic looparound circuit.

FIG. 3 is a block diagram of the previously noted DX switch 18 which is used to implement the invention, and is contained as the basic switching element in the message switch, circuit switch, and peripheral controllers. The switch itself is a combination time and space division switch which utilizes, in the preferred form, 8, 32 time divided channel input lines 19, and 8 time divided 32 channel output lines 20. Any of the channels of the input lines can be switched to any of the channels of the output lines as described in the aforenoted Canadian application No. 385,726. This basic function is also described in U.S. Pat. No. 4,093,827 issued June 6th, 1978 and assigned to Thompson-CSF, Paris, France. However in the present invention one of the output lines 20A is connected back to one of the input lines 19A, effecting a loop back structure. Accordingly any of the channels of the input lines 19 can be connected to any of the channels of the output line 20A which is looped back to input lines 19A, any channel of which can be connected to any channel of the output lines 20 (including 20A).

In the DX switch described in Canadian patent application No. 385,726 which is used in this invention, a parallel bus 21 interfaces with the DX switch whereby data signals from the parallel bus can be applied to any of the channels of any output line 20 (including 20A), and data signals from any channel from any of the input lines 19 (including 19A) can be received on parallel bus 21. This structure differs significantly from the structure of the noted Thompson-CSF patent, and facilitates the present invention.

Consequently it may be seen that test messages (i.e. PCM tones from service unit 14) can be received on any of the channels on any of the input lines 19 and be received on parallel bus 21, which bus interfaces message transmission paths leading to the control processor 7 as described in Canadian patent application Serial No. 421,936. Also any test message received on an input channel can be routed to the looped back output line 20A and to input line 19A via any of the channel assignments within the DX switch. Accordingly a path looped back through a local DX switch can be tested.

Further, a test message can be received on parallel bus 21 via the message link system, be applied via any of the channel assignments (stored in the local DX switch memory) be applied to the looped back output line 20A, input to the loopback input line 19A and be received back on the parallel bus 21. In this manner the DX switch 18 itself can be tested without utilizing any of the serial PCM channels on the remaining input and output lines. Clearly prior art systems could not test a loop as short as this, which involves only the basic switch matrix or network itself. This structure as well as other loopback structures will be better understood by a consideration of the detailed description of the system in which it is preferred to be used and of the DX switch itself, below.

It should be noted that the DX switches described herein are used as switching elements in the circuit switch, message switch, peripheral controller, etc., and route the signals to be transmitted, as well as the test signals in this invention.

Figure 4A:
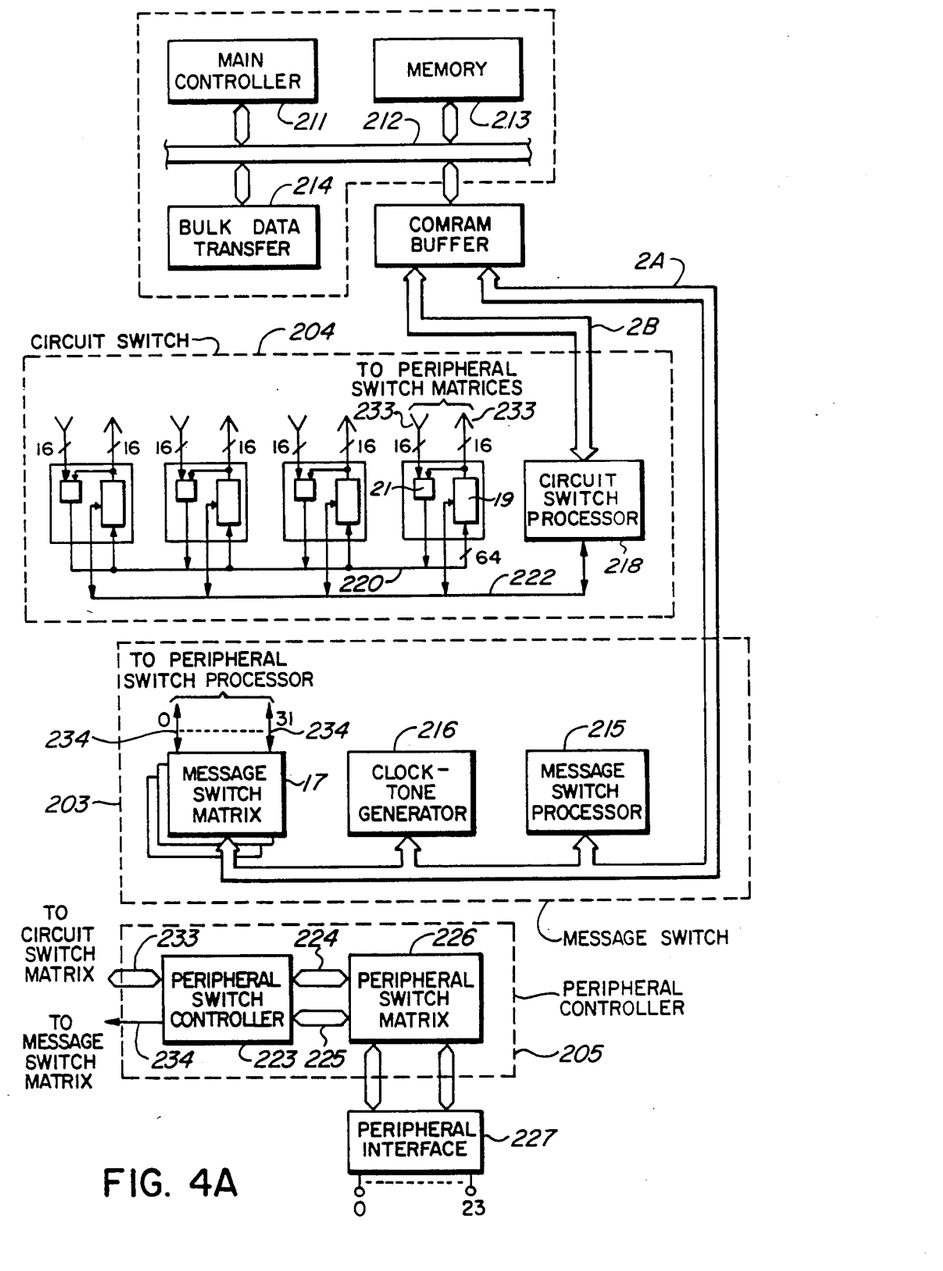
FIGS. 4A and 4B, are detailed block diagrams of the preferred combination time and space division switch network used in this invention, FIG. 4B appearing on the same sheet as FIGS. 1, 2 and 3, FIGS. 5A and 5B together form a block diagram of a so-called DX switch, referred to in the disclosure and used in the preferred embodiment of the invention.

FIG. 4A illustrates the preferred basic switching network in more detail as described in Canadian patent application Serial No. 421,936. The main control processor 7 is comprised of a main controller 211, formed of a microcomputer, which is connected in a well known manner to a main control bus 212. A mass data storage memory 213 is also connected to bus 212, as well as a bulk data transfer circuit 214. It is assumed that a person skilled in the art understands the operation of a microcomputer which can control the operation of a switching system.

The main controller in conjunction with memory 213 contains programs and data and controls the operation of the system and retains status memory maps of the elements of the system.

A communcation buffer referred to below as a COMRAM buffer 214 is connected to bus 212 via a 16 bit parallel bus. Buffer 214 is actually formed of two independent tube port buffers, one for use by the message switch 203 and one for use by the circuit switch 204 bidirectionally.

The COMRAM buffer 214 is connected via a parallel bus 202A to the message switch 203, and in particular to a message switch processor 215, a clock-tone generator 216 and a message switching matrix 217 within the message switch.

In the preferred embodiment message switching matrix has up to 32 bidirectional serial message links (0–31) which operate 2,048 megahertz. Each link is connected to a processor of a peripheral controller 205.

COMRAM buffer 214 is also connected via a parallel bus to the circuit switch 204, in particular to the circuit switch processor 218 which forms part of the circuit switch.

The circuit switch is also comprised of a circuit switch module having four sections which form a combination time and space division switching matrix. Each module contains a 64 parallel line input by 16 parallel line output switching matrix 219, having its 64 line input connected to a local bus 220, and the 16 line output being connected to peripheral switch transceivers. Sixteen return lines from the peripheral switch transceivers are connected in each section to a multiplexer 221, the output of which is connected to the bus 220. The circuit switch processor is connected to a control bus 222, to which the controllers of matrix 19 are connected.

The circuit switch module thus can switch up to four multiples of sixteen bidirectional serial links which are connected to the peripheral controllers 205.

The serial links are connected to transceivers within a peripheral switch controller 223 contained in each controller 225. The peripheral switch controller 223 also has dedicated links to the message switch matrix as described earlier. The peripheral switch controller is also connected via a 16 bit internal circuit bus 224 and by a control bus 225 to a peripheral switch matrix 226. The peripheral switch matrix 226 is connected to peripheral switch interface circuits 227 which have ports 0–23 to which peripheral devices are connected.

Figure 4B:
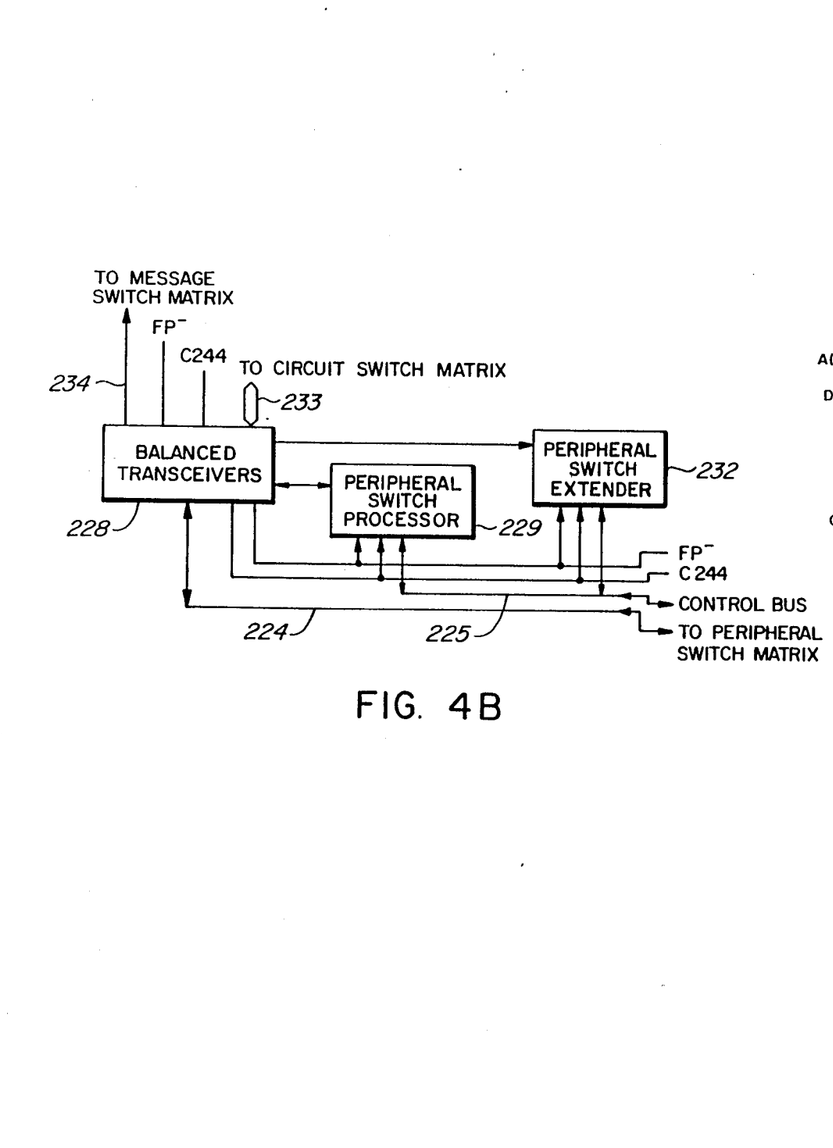

Turning to FIG. 4B, the peripheral switch controller 223 is shown in more detail. The links 233 to the circuit switch modules are connected to balanced transceivers 228. Also connected to balanced transceivers 228 are the links 234 to the message switch matrix 217, a line on which the frame pulse FP⁻ is received and the clock C244. The latter two lines are also extended to other components of the peripheral controller. The balanced transceivers 228 are connected to a peripheral switch microprocessor 229, which is connected to a control bus 225. The balanced transceivers 28 are connected to a bus 224 leading to the peripheral switch matrix. A peripheral switch extender 232 is connected to the balanced transceivers and the control bus as well as the frame pulse and clock lines.

Before proceeding further, it will be helpful to briefly describe the basic time and space division switch used in this invention, referred to herein as a DX switch. The switch is fully described in the patent application by Conrad Lewis, Canadian patent application No.

386,726, entitled TIME DIVISION SWITCHING MATRIX, filed Sept. 11th, 1981, to which the reader is referred. A block diagram of the DX switch is shown in FIGS. 5A and 5B.

Figure 5A:
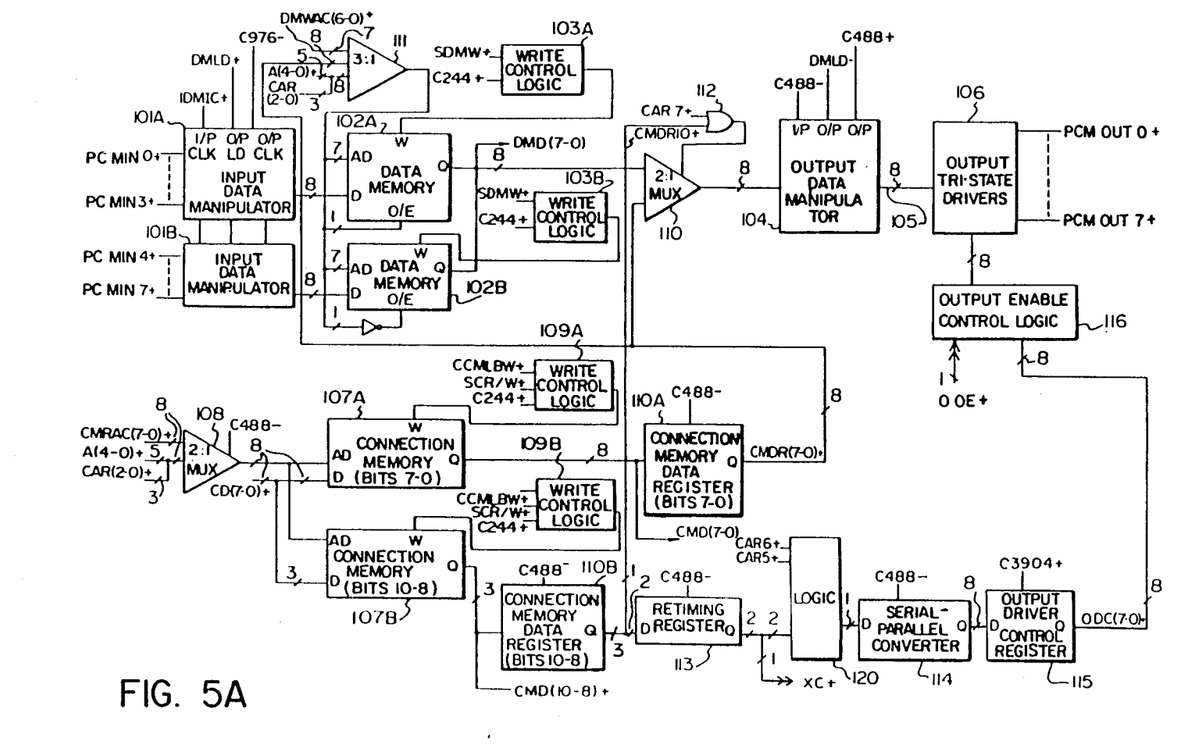
Figure 5B:
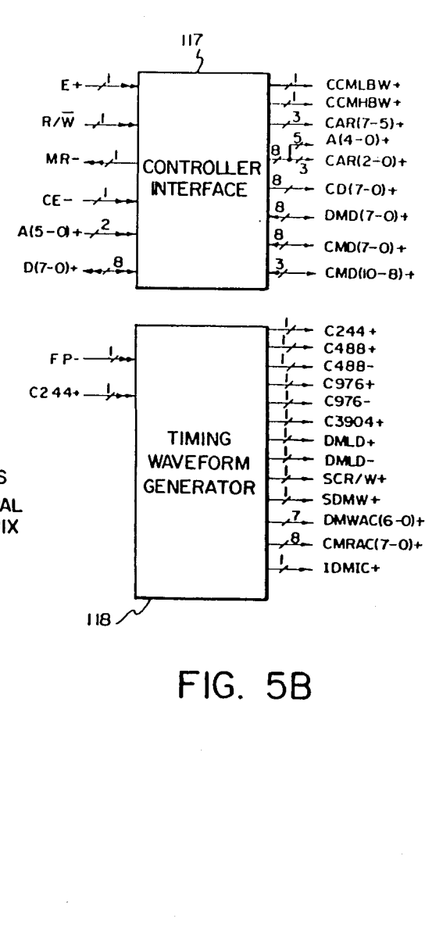

Turning to FIG. 5A, a plurality of input lines carrying time division multiplexed input signals, typically 8 lines in number referenced PCMIN0–PCMIN7 are connected to an input data manipulator, shown in two sections 101A and 101B. The data carried by each input line is received in serial format whereby the time sequence of data is divided into frames, each frame being divided into 32 channels, and each channel being divided into 8 bits comprising a data word. In the manipulators 101A and 101B, the input signals are converted from serial into parallel form. The resulting sequences of signals are applied via an 8 bit parallel link from each manipulator to the data D input of the two corresponding portions of a data memory 102A and 102B, referred to below as memory 102. The timing of the storage of this data in data memory 102A and 102B is controlled by write control logic circuits 103A and 103B which are controlled via a pair of leads SDMW and clock source C244, both carrying timing waveforms generated in a timing waveform generator 118 (FIG. 2D). The memory portion could of course be combined, as could the input data manipulator portions and write control logic circuits. The data memory for the example shown is organized as 256×8 bits for storing one frame from each of the 8 input lines, each of which carries a 2.048 MHz serial data streams.

The output port Q of data memory 102 is carried via an 8 bit parallel link through circuitry to be described later to an output data manipulator 104, which provides parallel to serial conversion. Manipulator 104 is operated by input, and output clock signals and output load timing signals on its I/PCLK, O/PCLK and O/PLD leads respectively.

8 bit parallel output leads 105 are connected to a corresponding number of tri-state switches or drivers 106, the outputs of which are connected to a group of 8 output leads PCMOUT 0–PCMOUT 7 each for carrying time division multiplexed output signals.

A 256×11 bit connection memory organized into an 8 bit portion 107A and a 3 bit portion 107B has its 8 bit parallel data input terminals D connected via line CD (7-0) to a controller interface 117 (FIG. 2D) for providing a source of data, which is connected to a microprocessor controller (not shown). The 8 parallel address inputs AD of the connection memory are connected to the output of a 2:1 multiplexer 108, which has two 8 bit parallel inputs. One of the inputs is divided into two groups, one for receiving addresses on 5 parallel lines A(4-0) and one for receiving addresses on 3 parallel lines CAR(2-0), for connection to a microprocessor controller via controller interface 117. The other 8 bit parallel input is connected to a timing waveform source via leads CMRAC(7-0). Write control logic circuits 109A and 109B have their outputs connected to the write leads W of the respective connection memory portions 107A and 107B, and have as inputs timing signals on leads CMLBW, SCR/W, and CLK244.

The 8 and 3 parallel output leads respectively from outputs Q of connection memory portions 107A and 107B are connected to the data inputs of a pair of corresponding connection memory data registers 110A and 110B. The output leads of connection memory portions 107A and 107B are also connected to the CMD(7-0) and CMD(10-8) inputs of a controller interface which is connected to a microprocessor controller.

The leads connected to the outputs Q of data memory portions 102A and 102B are connected to the DMD(7-0) inputs of the controller interface 117 which is connected to the microprocessor controller.

An 8 bit output of the connection memory data register 110A is applied to a corresponding 8 bit parallel inputs to multiplexers 110 and 111. The second 8 bit input of multiplexer 110 is connected to the output of the data memory (referred to below as 102), and the 8 bit parallel output of multiplexer 110 is connected to the input of serial to parallel converter output data manipulator 104. Seven of the 8 parallel output bits of multiplexer 111 are applied to the address AD input of data memory 102, while the eighth bit is applied to the output enable input through an inverter 119. An 8 bit parallel second input of multiplexer 111 is connected to the address A(4-0) output and the memory address output CAR(2-0) of controller interface 117. In addition, a third 7 bit parallel input is connected to timing waveform generator 118 on lead DMWAC(6-0).

Output bits 8–10 of the connection memory data register 110B are applied to a three bit parallel input CMDR10 of OR gate 112. A second input of OR gate 112 is connected to a CAR7 lead from the controller interface 117. The output of OR gate 112 is connected to the input selection part of multiplexer 110, whereby either of the two inputs to the multiplexer can be selected.

The output leads from the connection memory data register portion 110B carrying bits 8 and 9 are connected to the input of a retiming register 113. The bits are passed through to logic circuit 120, and a signle bit output lead is connected to the input of serial to parallel converter 114. The bit 9 output lead of retiming register 113 referenced XC is made available for control of an external circuit. Leads CAR6 and CAR5 from the controller interface 117 are connected to logic circuit 120.

Serial bits of the output lead from the connection memory data register 110 are converted to parallel format in serial to parallel converter 114, and are applied in 8 bit parallel form from the output Q of converter 114 to an output driver control register 115. The output leads CDC(7-0) from register 115, which carry output driver control signals, are connected to corresponding inputs of an output enable control logic circuit 116, with an output driver enable input lead ODE, which can be connected from external circuitry for forcing the output tri-state driver to a particular state from an external circuit. The output leads of output enable control logic 116 are connected to the control inputs of the output tri-state drivers 106.

A microprocessor controller interface circuit 117 (FIG. 5B) interfaces the above described circuit with a microprocessor controller (not shown) via leads E, R/W, MR, CE, address bus leads A(5-0) and data bus leads D(7-0). The inputs to the controller interface 117 are the data memory read data leads DMD(7-0), and the 11 connection memory read data leads CMD(7-0) and CMD(10-8). The outputs from controller interface 117 are the single individual controller connection memory low and high write enable leads CCMLBW and CCMHBW, 5 address bit leads A(4-0) controller address register bits CAR(2-0), controller address register bits (7-5) for specifying data and connection memory addresses, and 8 leads specifying connection memory input data CD(7-0).

In operation, input signals are received on leads PCMIN0–PCMIN7 and are converted from serial to parallel in the serial to parallel converter of input data manipulator, portions 101A and 101B. The parallel data is then written into a speech memory corresponding to data memory 102. An address memory, constituted by connection memory 107, stores addresses of data words to be read out to a parallel to serial converter corresponding to data manipulator 104, from where it is applied directly to the output lines PCMOUT0–PCMOUT7.

Thus the circuit performs the combination of time division switching and space division switching as noted above.

A microprocessor controller has both read access to the data memory 102 and read and write access to the connection memory 107. Consequently while the data memory 102 stores one frame of 8 bit words received on the 8 serial input links, any of this data can be read by the microprocessor controller. This is effected by the output of data memory 102 being connected via output leads DMD(7-0) from memory 102 to the input of controller interface 117. Thus data signals transmitted on the input PCM lines can be read by the microprocessor controller.

The microprocessor controller writes into the connection memory 107 via data leads CD(7-0) at addresses specified on leads A(4-0) and CAR(2-0) which are connected to multiplexer 108, and reads the contents of the connection memory via leads CMD(7-0) which are connected from the output of connector memory 107A to corresponding inputs of controller interface 117.

The microprocessor can also write directly to the output leads PCMOUT0–PCMOUT7 as follows. Signals from the connection memory are temporarily stored in the data register portions 110A and 110B. The most significant 8 bits output from the connection memory data register 110A ((CMDR(7-0)) are applied to one of the parallel input ports of multiplexer 110, while the output bits of data memory 102 are applied to the other input port. Since bit 10 from data register 110B with the bit on lead CAR7 from the microprocessor controller controls which of the two groups of inputs of multiplexer 110 are output therefrom to output data manipulator 104 and to the PCM output leads, it is clear that the microprocessor controller can substitute its own signals on the output leads instead of the PCM words from data memory 102.

As noted earlier, when such signals are stored in data memory 102 from a preceding similar switching matrix, either PCM voice signals or data signals, these signals can be read via leads DMD(7-0) from the output of data memory 102 directly to the local microprocessor through the controller interface 117. Controller to controller communication is thus facilitated using the present invention.

The signals stored in data memory 102 are normally designated to output PCM links and time slots by addresses specified by signals stored in the connection memory 107A, and which are input to multiplexer 111 via connection memory data register 110A and 8 bit parallel leads CMDR(7-0). In addition, the microprocessor can direct specific substitute words to be output from data memory 102 through memory address leads CAR(2-0) and A(4-0) which are input to multiplexer 111. A third source of signals to multiplexer 111 is timing signal lead DMWAC(6-0) which is connected from a timing waveform generator 118 (FIG. 2D).

The microprocessor writes 11 bit words (bits 0–10) into connection memory portions 107A and 107B at addresses specified on leads CAR(2-0) and A(4-0), at times specified by the write control logic circuits 109A and 109B, which issues write commands to the associated memory. Bit 10 of the connection memory is used to select either the data memory or bits 7-0 of the connection memory as the source of 8 bit words to be sent out on the serial output links. Depending on the state of bit 10, bits 7-0, either form the word to be transmitted via leads CMDR(7-0) and multiplexer 110 to the output data manipulator, or select one of the 256 8 bit words stored in the data memory to be transmitted on the corresponding output links during the corresponding channel time. As described earlier, bit 10 is passed through OR gate 112, which alters the state of multiplexer 110, defining the particular source of data which is enabled to pass therethrough to output data manipulator 104.

Bit 9 of the connection memory is used to control an external circuit. This bit is received from connection memory data register portion 110B, is corrected for phase in retiming register 113 with clock timing signal C488 and is made available on lead XC for control of external circuit.

Bit 8 passes from connection memory data register portion 110B through retiming register 113, through logic circuit 120 to serial to parallel converter 114, sequential bits being converted by serial to parallel converter 114 into 8 bit parallel form, which is stored in output driver control register 115. The output signal is applied to output enable control logic 116, from which it is applied to the gates of output tri-state drivers 106. The transmission and output impedance states of the tri-state drivers for corresponding output links are thereby specified.

When bit 10 is 0, bits 7-0 of the connection memory specify which one of the data memory words is to be sent out on the serial output link which corresponds to the connection memory location, during the channel time which corresponds to the connection memory location. Thus when bit 10 is 0, bits 7-0 are an address signal, which is applied from lead CMDR(702) through multiplexer 111 to the AD input of data memory 102.

When bit 10 is 1, bits 7-0 of the connection memory constitute the data word which is to be sent out on the serial output link which corresponds to the connection memory location, during the channel time which corresponds to the connection memory location. This word is passed through multiplexer 110 as described earlier.

The microprocessor controller thereby reads the serial input links from the data memory without concerning itself about frame, channel, and bit timing and serial to parallel conversion. By writing the connection memory, the microprocessor controller can transmit data words via the serial output links without concerning itself about timing and parallel-serial conversion.

It is thus clear that the DX switch can switch signals between incoming and outgoing channels on any of the incoming and outgoing lines, and can also transmit data to a microprocessor or receive data from a microprocessor and apply the data into any of the outgoing channels. The microprocessor, further, can control the switching paths within the DX switch. The DX switch can also control or send data to another device via the XC lead. The DX switch has been integrated into a single chip.

The present loopback invention is facilitated by the ability to transmit data in two directions via the parallel input to the DX chip, as well as into any of the several inputs and out of any of the serial outputs (any one of which can be connected back to any input).

Operation of the preferred system embodiment implementing the present invention will be described below with reference to the detailed block diagrams of FIGS. 6, 7 and 8.

Figure 8:
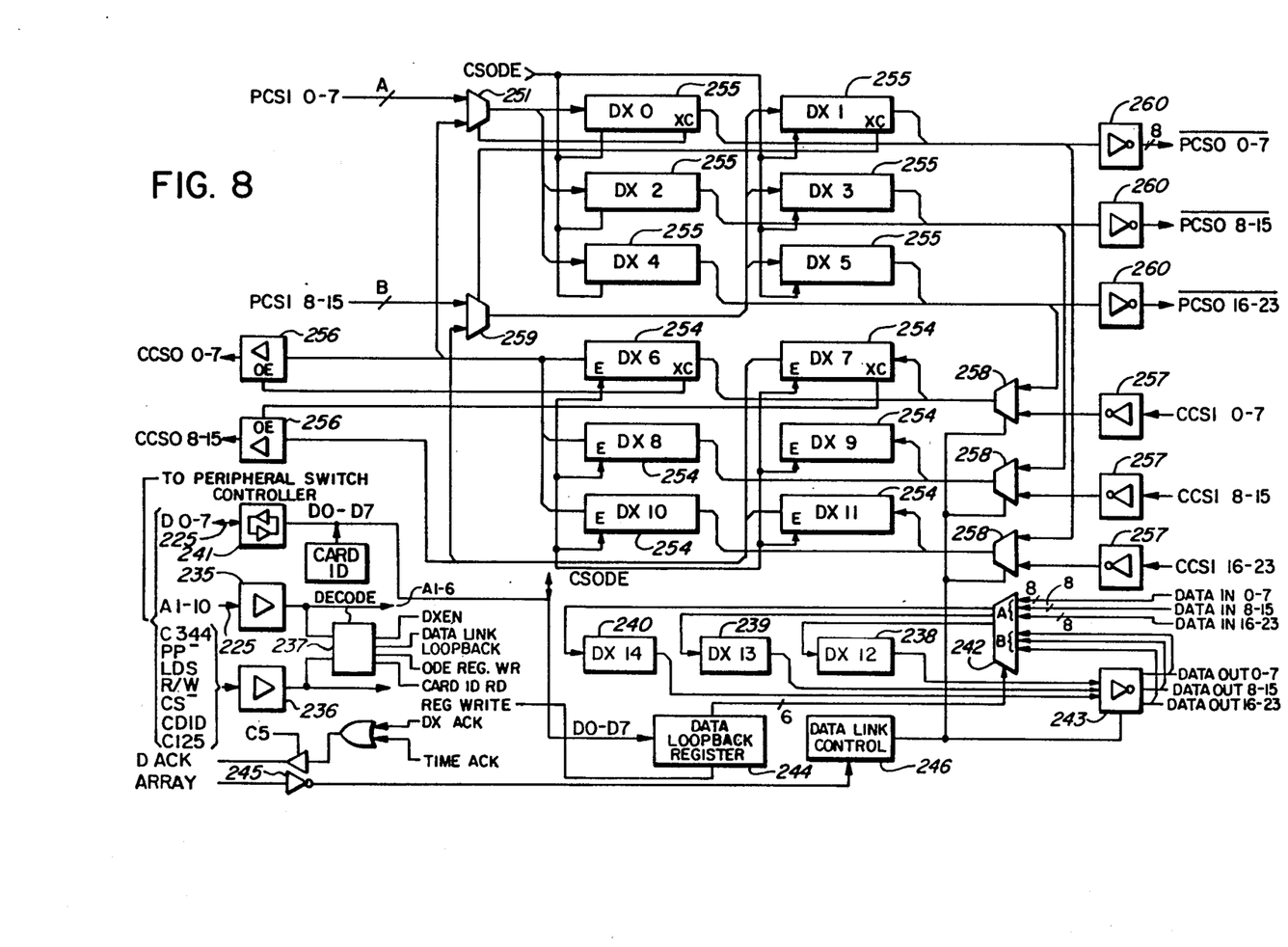
FIG. 8 is a block diagram of a peripheral switch matrix used in the preferred embodiment of the invention.

Turning first to FIG. 8, it is assumed that a peripheral interface circuit contains both PCM information signal paths and paths to peripheral interface controllers or controllers of the peripheral unit itself. Thus dedicated bi-directional data links DATA IN 0-7, DATA IN 8-15, DATA IN 16-23, DATA OUT 8-15 and DATA OUT 15-23 connected to the controllers of the peripheral interface circuits, and dedicated bidirectional signal transmission links PCS 0-7, PCS 8-15, PCS 16-23, CCS 0-7, CCS 8-15 and CCS 16-23 connect to the PCM information transmission ports of the peripheral interface circuits. The peripheral switch matrix to be described below performs traffic concentration from 48 bidirectional PCM links of 32 channels from the peripheral side into 8 or 16 bidirectional links of 32 channels which lead to the circuit switch.

The peripheral switch processor 229 (FIG. 4B) communicates via control bus 225 which is shown in FIG. 8 as constituting data leads D0-7, address leads A1-10 as well as leads C244, FP-LBS, R/W, CS−, CDID and C125 (being clock, frame pulse, load, read/write, chip select, and clock leads), as well as a data acknowledge (DACK) and array enable leads. The peripheral switch processor contains program signals to continuously scan the peripheral interface cards.

The peripheral switch processor outputs control signals on the aforenoted control bus which are passed through buffers 235 and 236, decoded in decoder 237 and emerge on a bus labelled DXEN (DX switch enable), DATA LINK LOOP BACK, ODE REG WR and card ID RD (card identification read). The DX enable, and other leads from the peripheral switch processor interface the controller interface and timing waveform generator of each of three 8×8 DX switches 238, 239 and 240. Similarly the data lines D0-D7 are connected through a bidirectional buffer 241, its D0-D7 output leads being connected to the controller interface of the three DX switches. The data input leads of the peripheral interface, DATA IN 0-7, DATA IN 8-15 and DATA IN 16-23, are connected to one phase input of multiplexer 242, which has its three outputs connected to the PCM IN 0-7 input leads respectively of the DX switches 238-240. The PCM OUT 0-7 leads of the three DX switches are connected to three inputs of a buffer 243 which has its three outputs connected to the data output leads DATA OUT 0-7, DATA OUT 8-15 and DATA OUT 16-23 to the controller of peripheral interfaces. Accordingly a bidirectional transmission link is set up between the peripheral switch processor 229 (FIG. 4B) and the data output and data input leads to the peripheral interface circuits via the three DX switches 238, 239 and 240.

The peripheral switch processor outputs the test signal received from the service unit via the message system which is passed into the connection memory and then into the data memory of the three DX switches. This signal is the one which will be looped back and read by the control processor. The looped back signal is stored in the data memory of a corresponding DX switch which is active during the interval corresponding to the desired channels. The data memory contents of the DX switch are received by the peripheral switch processor 229 via the data memory output DMD lead (FIG. 5A), which data passes via buffer 241 (FIG. 8) to the control bus 225 (FIG. 4A).

The peripheral switch processor continuously scans the peripheral units for messages from intelligent peripherals designated for the main control. The peripheral switch processor 229 also utilizes controller interface to the DX switches 238-240 in a similar manner to transmit scan control message signals out on the PCM DATA OUT 0-23 links of these DX switches.

In case intelligent peripherals are used, having a signal path loopback capability, a loop can be set up between only the peripheral, or via any link right back to the circuit switch.

Since the links are dedicated for each peripheral, the particular scan signal format and peripheral state message signal format can be set to suit the design. In a prototype, the message signal was formed in which a message type formed part of the first byte, a control byte formed the last byte which had portions designating the protocol and included protocol control bits, and the remaining bytes contained the message such as the addresses of the sender and receiver, a function code (i.e. loopback enble), data bytes a checksum etc. The message typically 18 bytes in length contained one or more function codes designating a numerical representation of a function to be performed, and a number of data bytes that this function could use as parameters. The number of bytes to follow the function code was indicated by the code itself, i.e. one code may indicate that three bytes of data may follow while another code may not require any data at all.

Assuming that the peripheral switch processor 229 has detected the looped back signal stored in the data memory of one of the DX switches 238-240, it formats the message and stores it in a software buffer for transmission via a balanced transceiver 228 and the message switch matrix to the main control, which passes it to the service unit for evaluation.

The data link loopback output is input into DX switches 238, 239 and 240, and constitutes a decoded message to the DX switches to connect certain channels to their parallel interface. The data output D0-D7 is decoded in the data loopback register 244, and enable the B channel of multiplexer 242 to input (to loop back) signals from the output buffer 243. In this manner a signal injected via the parallel inputs to DX switches 238-240 from the message links (directly from the control processor) can be looped back and read by the same processor. The DX switches 288-240 are thereby checked for proper operability without tying up valuable communication circuit transmission links.

In a similar manner, multiplexers 258 can be enabled to loop back signals output from DX switches 255 to DX switches 254, and read by the control processor (or service unit) interfacing DX switches 254 and 254 via the message link network.

In addition, signals transmitted to the circuit switches and transmitted to the DX switches 255 can be looped back as noted above and read either at the circuit switches or at the DX switches 254 and 255 by the control processor (or service unit) via the message link network. However in this case there is a further facility; a signal can be presented via the XC outputs of DX switches 255 to enable multiplexers 259 to loop back a signal output from DX switches 254 to the inputs of DX switches 255, and read from the DX switches by the control processor (or service unit) via the message network.

Thus it may be seen that individual switches, switching networks, and specific links with specific interconnection links within the switching networks can be checked, with minimal disruption to the communication circuit links.

As noted above, the data output leads DATA OUT 0-23 of buffer 243 are connected to the second phase input ports of multiplexer 242. Multiplexer 242 puts through either phase A or phase B inputs, and is actuated via a signal received from a data loop back register 244, which receives data signals via buffer 241 resulting from the peripheral switch processor signal. When a predetermined signal is received by the data loop back register 244, it causes multiplexer 242 to connect the output leads of the buffer 243 through to its output leads in phase of the DATA IN 0-23 leads, thereby providing a facility whereby a signal received either from the peripheral switch processor 229 or from the peripheral interface circuit via the DATA IN 0-23 leads may be stored in the data memory of the DX switches 238-240.

A signal from the peripheral switch processor 229 is also applied via an inverter 245 to a data link control circuit 246 which output, connected to buffer 243, controls the state of each of the links passing through buffer 243.

The message switch 203 (FIG. 4A) continuously scans each peripheral switch processor to determine whether a message signal is stored in its output buffer. The message switch processor 215 sends a predetermined cyclic scanning message to the message switch matrix 217 via lead A0-A7, D0-D7, etc. (FIG. 4). This scanning message (i.e. designating "do you have a message"?) is applied to the connection memory 107A of DX switches 250 (see FIGS. 7 and 5A) through multiplexer 110 so that the PCM output links are connected through the balanced differential drivers 251 (FIG. 7) to the output message links 252 leading to the peripheral switch transceivers, and polls each peripheral switch processor for a response message indicating that its output buffer contains a message. In response, the polled peripheral switch processor sends the message, clearing its buffer.

The message signal from the peripheral switch processor 229 having passed through transceiver 228 appears on one of the input message links 247 to balanced differential receivers 248. The signal passes through a tri-state buffer 249 and is applied via one of the input leads PCM 0-PCM 7 (FIG. 5A) to the data memory of one of the DX switches 250 of an array of 8. This occurs after the peripheral switch processor has been scanned.

The response message signal is thus passed via the dedicated serial input message links 247, through balanced differential receivers 248, through tristate buffer 249 and into the PCM input link of one of the DX switches 250, (the DX switch selected depending on the input link and channel via decoders 230).

Figure 7:
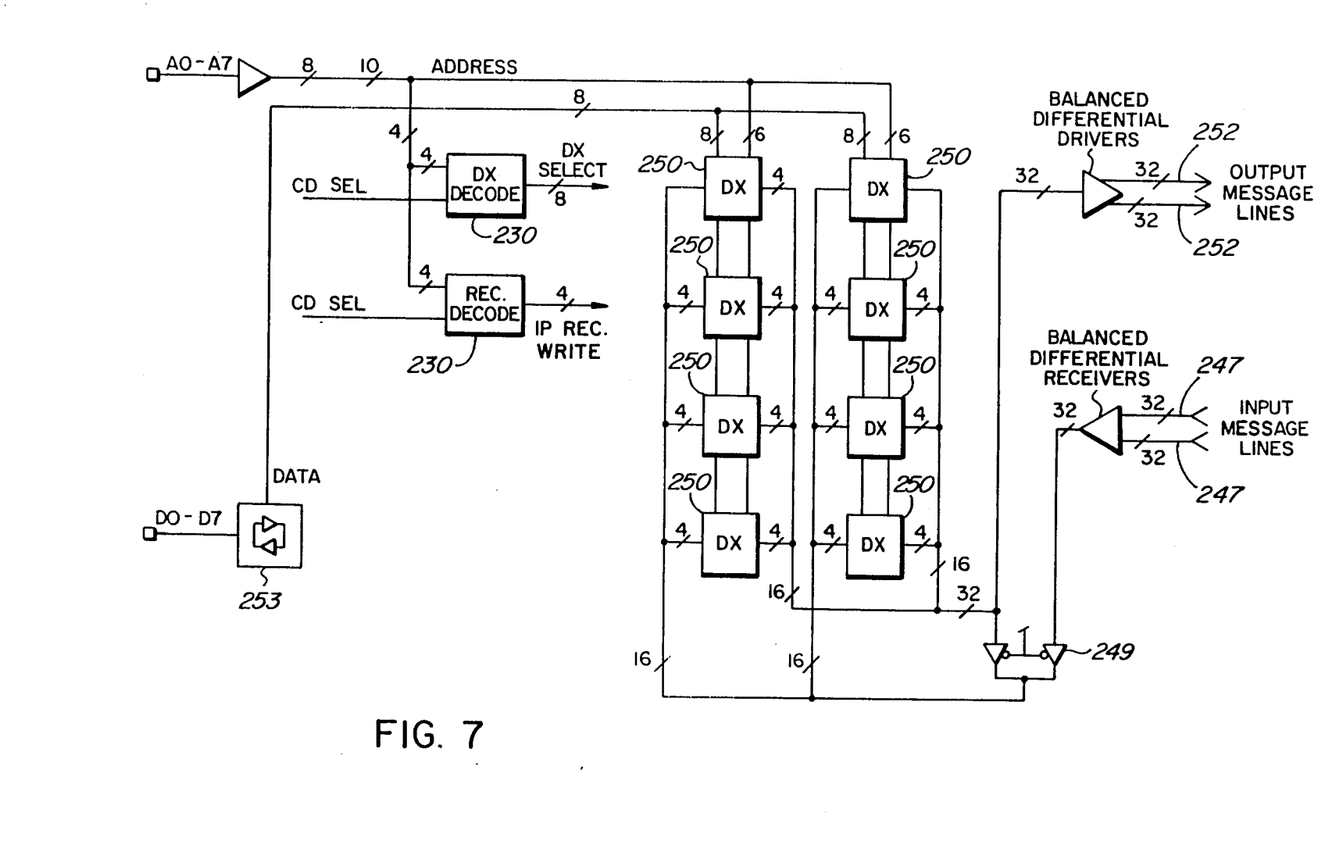
FIG. 7 is a block diagram of a message switch matrix used in the preferred embodiment of the invention.

The message switch processor accesses the data stored in the DX switch data memory via its DMD lead (FIG. 5A) and the controller interface, shown substantially in FIG. 7 as buffer 253. The data is applied to parallel bus 212 (FIG. 4A) and is received by COM-RAM BUFFER 14 for application to the main control.

The main controller 211 of main control 107 continuously scans the COMRAM BUFFER 14, which is a first in - first out buffer, and reads data contained therein.

The main controller, having received a message signal via the system described above of the returned test signal, formulates a message and transmits it to the service unit 214, of the test signal, and also formulates a message signal to be returned to the peripheral acknowledging that it has received the message. This signal is downloaded via parallel bus 212 into COM-RAM BUFFER 214, which operates in the reverse direction in the same way as described earlier. The signal is accessed by the message switch processor 215 which loads it into the data memory of one of the DX switches 250 (FIGS. 5A, 5B and 7) via the controller interface 117, connection memory 107A and multiplexer 111. The signal is then passed via one of the PCM output links PCM OUT 0-7 and message links 252 (FIG. 7, or 34, FIGS. 4A and 4B) to the peripheral controller 205. In particular, the signal is received on a message switch link 234, passing through balanced transceivers 228 (FIG. 4B) to the peripheral switch processor 229. The peripheral switch processor thus has received an indication that the main control acknowledges receipt of the message.

In case a link from the circuit switch is to be tested in conjunction with a DX chip connection channel, the main controller reviews its memory map of the signal circuit paths between the DX chip to be looped back and a circuit link to the circuit switch 204. Assuming that the location of an idle path has been determined, the main controller sends a message signal to the peripheral controllers, and to the circuit switch processor 218 to set up the circuit path.

The message signal is received by the peripheral switch processor 229 via the message links as described earlier, and applies DX switch control signals to its control bus 225. In this case, however, the signals are meant for one or both of the two DX switch switching arrays consisting of DX switches 254, (FIG. 8) which handle signals normally received from a peripheral, or DX switches 255 which handle signals destined for a peripheral.

For the present example, where a complete circuit is to be tested, the signals received by the peripheral switch processor cause it to set up a loopback link between one of the PCM input lines PSCI 0-15 to one of the DX switches 255, through loopback multiplexers 258, DX switches 254, to a specific output line CCSO 0-15. The output line is connected through one of the buffers 256 to one of the output lines CCSO 0-7 and CCSO 8-15.

Returning to FIG. 4A, the main control 207 also sends a signal via the COMRAM BUFFER 214 and associated parallel bus 202B to the circuit switch processor 218. In response, the circuit switch processor 218 (FIG. 4A) applies a signal to one or more of the DX switch matrices 219 and multiplexers 221 to set up a transmission path between an incoming link from a peripheral switch buffer 256 (FIG. 8), through multiplexer 221 (FIG. 4A) to the local bus 220 and out to a particular outgoing channel on a particular outgoing link via matrix 219. In this manner a bidirectional link is set up between the channels of the leads PCST 0-7 and CCSO 8-15 (FIG. 8), through the circuit switch matrix (FIG. 4A) to another link leading to a similar peripheral switch matrix as described above. That matrix is also looped back as described above, except that the loop is not made continuous through a DX switch (otherwise a feedback effect will be obtained).

A test tone from the service unit is encoded and sent under control of the message switch processor into the message switching matrix. The signal is transmitted as a PCM signal to the peripheral controller and is applied by the peripheral switch processor through the DX switches associated with the telephone peripheral into the loop, the signal passed through the loop is sent back to the service unit by the message system as described earlier, for evaluation by the service unit.

Figure 6:
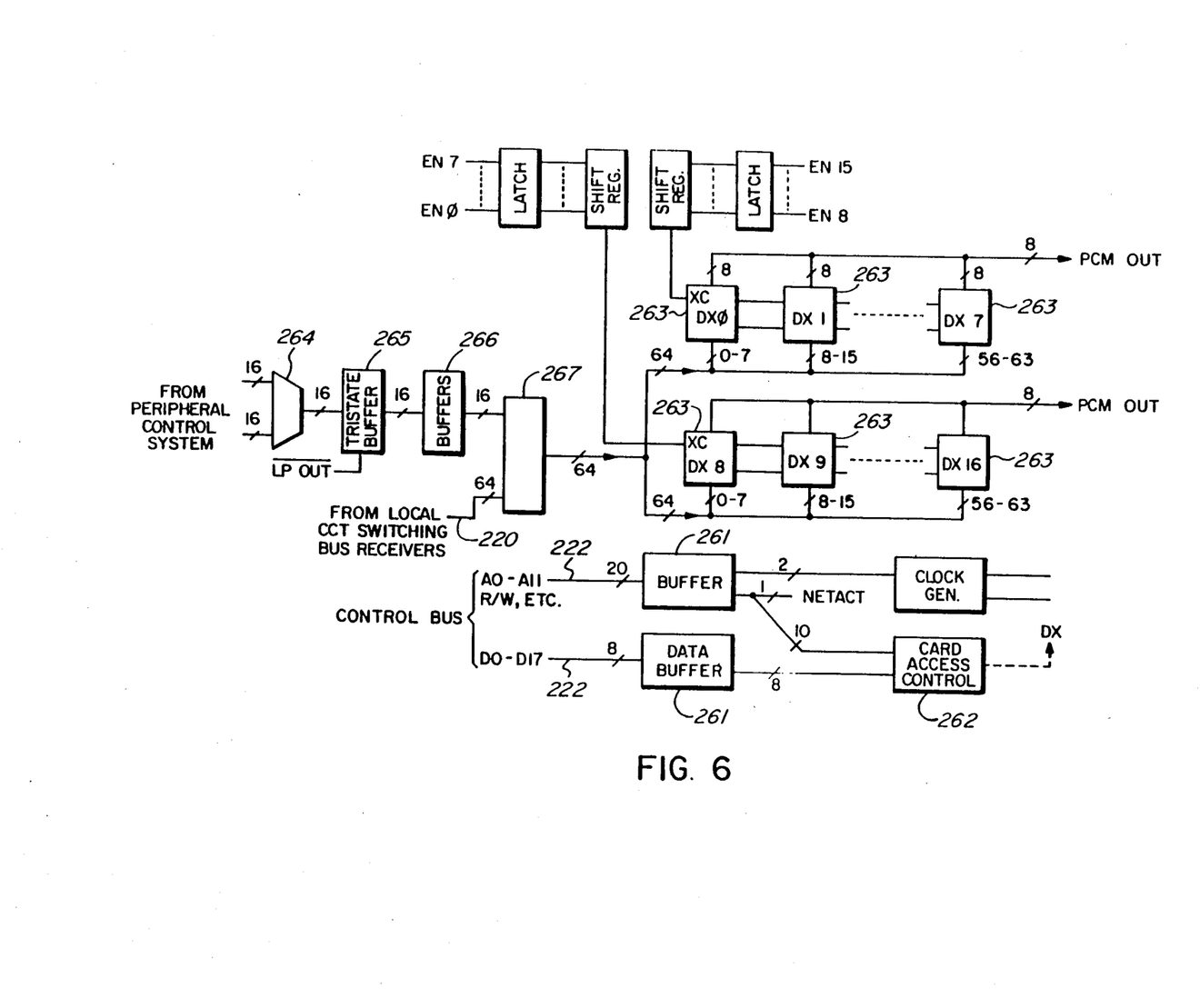
FIG. 6 is a block diagram of a circuit switch matrix used in the preferred embodiment of the invention.

Turning briefly to FIG. 6, one of the four circuit switch switching sections shown in FIG. 4A is illustrated. A signal is received from the main control by the circuit switch processor via bus 228, which is applied to the control bus 222. The signal passes through buffers 261 and card access control 62, which are in controller 117, interface 262 from which it is applied to the connection memory of one of the DX switches 263 of an array 216. A particular input to output channel transmission path is thereby made between one of the input channels to one of the PCM output channels PCM OUT.

Input signals from the peripheral controller transceivers received via multiplexer 264, are passed through tristate buffers 265 and 266 and via one phase input through multiplexer 667 to the PCM input leads of the DX switch 263 array. The 64 lead local switching bus 220 is also connected to the second phase input of multiplexer 267, whereby signals from other switching matrices within the circuit switch can be applied as input to this DX switch array.

For testing the circuit switches themselves, or in conjunction with an input link, the outputs of DX switches 250 can be returned to their inputs via loopback multiplexer 245, which is enabled in a similar manner as described earlier with respect to the peripheral controller matrix.

Loopback test tone signals can be injected into the loop via the parallel interface to the DX switches, or via a serial input, received via an input link from another DX switch at the peripheral controller matrix which receives the test tone from the service unit via the message links The resulting signal having passed through the loop can be read either from the DX switch memories, or from a serial output, as desired.

In summary, using the message switch paths described above, a loopback can be set up in the peripheral controller by which the output channels of DX switches 255 are connected back through multiplexers 58 to the input switches of DX 54 (FIG. 8). A test signal, generated under control of controller processor 7 in service unit 14 passes down the message system to the peripheral controller, to interface DX switches 255 and 254 to test each of the channel switching functions in each of the DX switches. Further, rather than looping back to multiplexers 258, a loop can be set up from DX switches 255, out to the peripheral interface cards, to become looped back via a DX switch in a particular interface card, back through multiplexer 258 to DX switch 254, both the test and receive signals being transmitted and received via DX switches 255 and 254 to the peripheral switch controller message links as described earlier.

Clearly by the use of this invention, individual switches, short links, long links, and entire links between peripheral units as well as links between message unit elements encompassing switches, portions of complete message links and entire message links can be tested. It has been found that the separation of the supervisory and control transmission paths into a message system which is separate from the communication links passing through the circuit switch paths sustantially reduces the traffic loading on a system, thus allowing an increased traffic capacity handling for communication paths between peripherals. The free time available to the switches and links are used to test the switches and links, and since entire transmission paths between peripherals need not be set up to effect the testing, a substantial increase in the elements available for carrying normal communication traffic is made available. Further, since the testing loops can be made as long or short as desired, the pinpointing of faulty links, switches or even memory locations within the DX switches can be done faster, utilizing fewer communication path components than previously. This clearly results in reduction in cost of equipment for a given traffic carrying capacity and rendering fault finding to be quicker than in prior art systems.

A person understanding this invention may now conceive of other embodiments and variations in design using the principle disclosed herein. All are considered to be within the sphere and scope of this invention as defined in the claims appended hereto.

I claim:

1. A switching system test circuit comprising:
   (a) a main system control means,
   (b) switching means under control of the control means for switching any of a plurality of input paths to any of a plurality of output paths,
   (c) supervisory and control circuit path means for connection between the switching means and the control means for transmitting and/or receiving signals between any of the output or input paths respectively and from the control means,
   (d) one of the output paths being connected to one of the input paths externally of the switching means, whereby a signal carried by any of the input paths can be switched to said one output path internal of the switching means and appear on said one input path, and be received by the control means, thus facilitating a test of said switching means.

2. A test circuit as defined in claim 1 in which the switching means is comprised of separate unidirectional input and output switches for carrying unidirectional transmission paths, forming a bidirectional switched link, an output path of the input switch being connected to an input path of the output switch via the input of a multiplexer, additional input paths being connected to another input of the multiplexer.

3. A test circuit as defined in claim 2 including:
   (i) a plurality of peripheral units, including control circuit means associated therewith,
   (ii) a circuit switching network for carrying communication signals between peripheral units,
   (iii) a message switching network for carrying supervisory and control signals relating to the peripheral unit control circuit means between the main system control means and the control circuit means,
   (iv) the control circuit means including a peripheral switch matrix comprised of said switching means, for switching said input and output paths between the circuit switching network and the peripheral units, and said supervisory and control circuit paths to the message switching network.

4. A test circuit as defined in claim 2 including:

(i) a plurality of peripheral units, including control circuit means associated therewith, (ii) a circuit switching network for carrying communication signals between peripheral units, (iii) a message switching network for carrying supervisory and control signals relating to the peripheral unit control circuit means between the main system control means and the control circuit means, (iv) the control circuit means including a peripheral switch matrix comprised of said switching means, for switching said input and output paths between the circuit switching network and the peripheral units, and said supervisory and control circuit paths to the message switching network, (v) means for setting up a transmission path loop around one of said switching means via said one of said output paths connected to said one of said input paths, or from one peripheral to another via the control circuit means, or between a control circuit means and the circuit switching network, or between individual control circuit means via the circuit switching network or between a peripheral unit and a control circuit means, or between one peripheral unit and another via associated control circuit means and the circuit switching network, (vii) means for injecting a test signal into one side of said loop via the message switching network, and for receiving the test signal from the other side of said loop via the message switching network.

5. A test circuit as defined in claim 1 in which the switching means is comprised of a combination time and space division switch for switching digital pulse code modulated signals from time divided input channels of the input paths to time divided output channels of the output paths.

6. A test circuit as defined in claim 5 including:
(i) a plurality of peripheral units, including control circuit means associated therewith,
(ii) a circuit switching network for carrying communication signals between peripheral units,
(iii) a message switching network for carrying supervisory and control signals relating to the peripheral unit control circuit means between the main system control means and the control circuit means,
(iv) the control circuit means including a peripheral switch matrix comprised of said switching means, for switching said input and output paths between the circuit switching network and the peripheral units, and said supervisory and control circuit paths to the message switching network.

7. A test circuit as defined in claim 5 including:
(i) a plurality of peripheral units, including control circuit means associated therewith,
(ii) a circuit switching network for carrying communication signals between peripheral units,
(iii) a message switching network for carrying supervisory and control signals relating to the peripheral unit control circuit means between the main system control means and the control circuit means,
(iv) the control circuit means including a peripheral switch matrix comprised of said switching means, for switching said input and output paths between the circuit switching network and the peripheral units, and said supervisory and control circuit paths to the message switching network,
(v) means for setting up a transmission path loop around one of said switching means via said one of said output paths connected to said one of said input paths, or from one peripheral to another via the control circuit means, or between a control circuit means and the circuit switching network, or between individual control circuit means via the circuit switching network or between a peripheral unit and a control circuit means, or between one peripheral unit and another via associated control circuit means and the circuit switching network,
(vii) means for injecting a test signal into one side of said loop via the message switching network, and for receiving the test signal from the other side of said loop via the message switching network.

8. A test circuit as defined in claim 1 including:
(i) a plurality of peripheral units, including control circuit means associated therewith,
(ii) a circuit switching network for carrying communication signals between peripheral units,
(iii) a message switching network for carrying supervisory and control signals relating to the peripheral unit control circuit means between the main system control means and the control circuit means,
(iv) the control circuit means including a peripheral switch matrix comprised of said switching means, for switching said input and output paths between the circuit switching network and the peripheral units, and said supervisory and control circuit paths to the message switching network.

9. A test circuit as defined in claim 1 including:
(i) a plurality of peripheral units, including control circuit means associated therewith,
(ii) a circuit switching network for carrying communication signals between peripheral units,
(iii) a message switching network for carrying supervisory and control signals relating to the peripheral unit control circuit means between the main system control means and the control circuit means,
(iv) the control circuit means including a peripheral switch matrix comprised of said switching means, for switching said input and output paths between the circuit switching network and the peripheral units, and said supervisory and control circuit paths to the message switching network,
(v) means for setting up a transmission path loop around one of said switching means via said one of said output paths connected to said one of said input paths, or from one peripheral to another via the control circuit means, or between a control circuit means and the circuit switching network, or between individual control circuit means via the circuit switching network or between a peripheral unit and a control circuit means, or between one peripheral unit and another via associated control circuit means and the circuit switching network,
(vii) means for injecting a test signal into one side of said loop via the message switching network, and for receiving the test signal from the other side of said loop via the message switching network.

10. A switching system test circuit comprising:
(a) a switching system including a communication circuit path switching network,
(b) a peripheral switching network for connection to a plurality of peripherals,
(c) links switchable between the peripheral switching network and the circuit path switching network,
(d) each of the switching networks being comprised of switching elements,
(e) means for establishing a test transmission loop comprising any switching element, or a combination of a switching element of one switching network with one of said links, or a combination of a switching element of any of more than one switching network with one or more of said links, and a test signal injection point and a resulting test signal reception point at opposite ends of the loop, and (f) means for providing the test signal to the injection point and receiving the resulting test signal from the reception point.

11. A test circuit as defined in claim 10, in which each switching network is comprised of a time division switching means.

12. A test circuit as defined in claim 10, in which each switching network is comprised of a combination time and space division switching means, having a plurality of multi-channel input paths and a plurality of multi-channel output paths.

13. A test circuit as defined in claim 12, in which the means for providing and receiving the test signals is comprised of one or more separate message circut paths connected between the test signal injection point, means for generating the test signal and means for receiving the resulting test signal.

14. A test circuit as defined in claim 12, further including means for connecting an output path to an input path, whereby a loopback path can be established between any input channel and any output channel on said latter output path.

15. A test circuit as defined in claim 14, in which the means for providing and receiving the test signals is comprised of one or more separate message circut paths connected between the test signal injection point, means for generating the test signal and means for receiving the resulting test signal.

16. A test circuit as defined in claim 10, in which the means for providing and receiving the test signals is comprised of one or more separate message circut paths connected between the test signal injection point, means for generating the test signal and means for receiving the resulting test signal.

17. A test circuit comprising a switching system comprised of one or a plurality of switching matrixes, means for injecting a test signal into and receiving a resulting signal from at least one switching matrix, and means for connecting an output line of said matrix to one or more input lines of said matrix, whereby the quality of transmission through said matrix can be tested, said one matrix being a time division switching network having a plurality of time divided input lines and a plurality of output lines, said one matrix including an auxiliary bi-directional link for carrying said test and said resulting signals, and means for applying the test signal into any predetermined channel carried by said one matrix, and for receiving said resulting signal from a predetermined channel when said output line is connected to one of said input lines.

18. A test circuit as defined in claim 17, including means for receiving signals from said auxiliary link for controlling said matrix.

* * * * *